(12) United States Patent
Qian et al.

(10) Patent No.: US 10,129,141 B2
(45) Date of Patent: Nov. 13, 2018

(54) METHOD, MOBILE TERMINAL, AND APPARATUS FOR MANAGING ROUTING DEVICE

(71) Applicant: Xiaomi Inc., Beijing (CN)

(72) Inventors: Zhuang Qian, Beijing (CN); Yong Chen, Beijing (CN); Yidong Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/365,352

(22) Filed: Nov. 30, 2016

(65) Prior Publication Data

US 2017/0155578 A1    Jun. 1, 2017

(30) Foreign Application Priority Data

Dec. 1, 2015 (CN) .......................... 2015 1 0868437

(51) Int. Cl.
| | | |
|---|---|---|
| *H04L 12/717* | (2013.01) | |
| *H04L 12/751* | (2013.01) | |
| *H04W 4/00* | (2018.01) | |
| *H04L 12/24* | (2006.01) | |

(52) U.S. Cl.
CPC ............ *H04L 45/42* (2013.01); *H04L 41/085* (2013.01); *H04L 45/02* (2013.01); *H04W 4/00* (2013.01); *H04L 41/0866* (2013.01)

(58) Field of Classification Search
None
See application file for complete search history.

(56) References Cited

U.S. PATENT DOCUMENTS

2016/0143069 A1* 5/2016 Xie ....................... H04W 12/04
370/329

FOREIGN PATENT DOCUMENTS

| | | |
|---|---|---|
| CN | 103873359 A | 6/2014 |
| CN | 104010309 A | 8/2014 |
| CN | 104506443 A | 4/2015 |
| CN | 104639354 A | 5/2015 |
| CN | 104820509 A | 8/2015 |
| CN | 105094966 A | 11/2015 |
| CN | 105517016 A | 4/2016 |
| EP | 2 413 547 A1 | 2/2012 |
| JP | 4978895 B2 | 7/2012 |
| WO | WO 2009/120898 A2 | 10/2009 |
| WO | WO 2015109163 A1 | 7/2015 |
| WO | WO 2015/172632 A1 | 11/2015 |

OTHER PUBLICATIONS

Extended Search Report for European Application No. 16201002.9 from the European Patent Office, dated May 16, 2017.
International Search Report of PCT Application No. PCT/CN2016/097175 dated Nov. 15, 2016, issued by the ISA/CN—State Intellectual Property Office of the P.R. China.

* cited by examiner

*Primary Examiner* — Diane Lo (74) *Attorney, Agent, or Firm* — Finnegan, Henderson, Farabow, Garrett & Dunner LLP (57) ABSTRACT

A method includes: obtaining, by a mobile terminal, first network connection parameters of a routing device connected to the mobile terminal; according to the first network connection parameters, determining, by the mobile terminal, whether the mobile terminal has a management permission for managing the connected routing device; and if the mobile terminal has the management permission for managing the connected routing device, managing, by the mobile terminal, the connected routing device.

7 Claims, 6 Drawing Sheets

METHOD, MOBILE TERMINAL, AND APPARATUS FOR MANAGING ROUTING DEVICE

CROSS-REFERENCE TO RELATED APPLICATIONS

The present application is based upon and claims priority to Chinese Patent Application No. 201510868437.1, filed Dec. 1, 2015, the entire contents of which are incorporated herein by reference.

TECHNICAL FIELD

The present disclosure generally relates to the field of Internet technologies, and more particularly, to a method, mobile terminal, and apparatus for managing a routing device.

BACKGROUND

Routing devices not only provide network connections, but also can realize intelligent management. For example, users can manage the routing devices through mobile terminals, and can also access data stored in the routing devices.

If a user has a plurality of routing devices, they can be displayed in a router management list of a mobile terminal. At present, by default a mobile terminal generally manages the first routing device in the router management list or the last used routing device. Thus, when the user moves the mobile terminal from one place to another, the user needs to manually switch a managed routing device, through the mobile terminal, to a routing device in the current place.

For example, the user has two routing devices: a first routing device installed in an office, and a second routing device installed in the user's home. When the user is at the office, the user can access office documents stored in the first routing device through the mobile terminal. When the user returns home, the user needs to manually switch a managed routing device, i.e., the first routing device, through the mobile terminal, to the second routing device to access photos, videos, and the like stored in the second routing device.

SUMMARY

According to a first aspect of the present disclosure, there is provided a method for managing a routing device. The method includes: obtaining, by a mobile terminal, first network connection parameters of a routing device connected to the mobile terminal; according to the first network connection parameters, determining, by the mobile terminal, whether the mobile terminal has a management permission for managing the connected routing device; and if the mobile terminal has the management permission for managing the connected routing device, managing, by the mobile terminal, the connected routing device.

According to another aspect of the present disclosure, there is provided a mobile terminal for managing a routing device. The mobile terminal includes a processor and a memory for storing instructions executable by the processor. The processor is configured to: obtain first network connection parameters of a routing device connected to the mobile terminal; according to the first network connection parameters, determine whether the mobile terminal has a management permission for managing the connected routing device; and if the mobile terminal has the management permission for managing the connected routing device, manage the connected routing device.

According to another aspect of the present disclosure, there is provided a non-transitory readable storage medium storing instructions that, when executed by a processor of a mobile terminal, cause the processor to perform a method for managing a routing device. The method includes: obtaining, by a mobile terminal, first network connection parameters of a routing device connected to the mobile terminal; according to the first network connection parameters, determining, by the mobile terminal, whether the mobile terminal has a management permission for managing the connected routing device; and if the mobile terminal has the management permission for managing the connected routing device, managing, by the mobile terminal, the connected routing device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
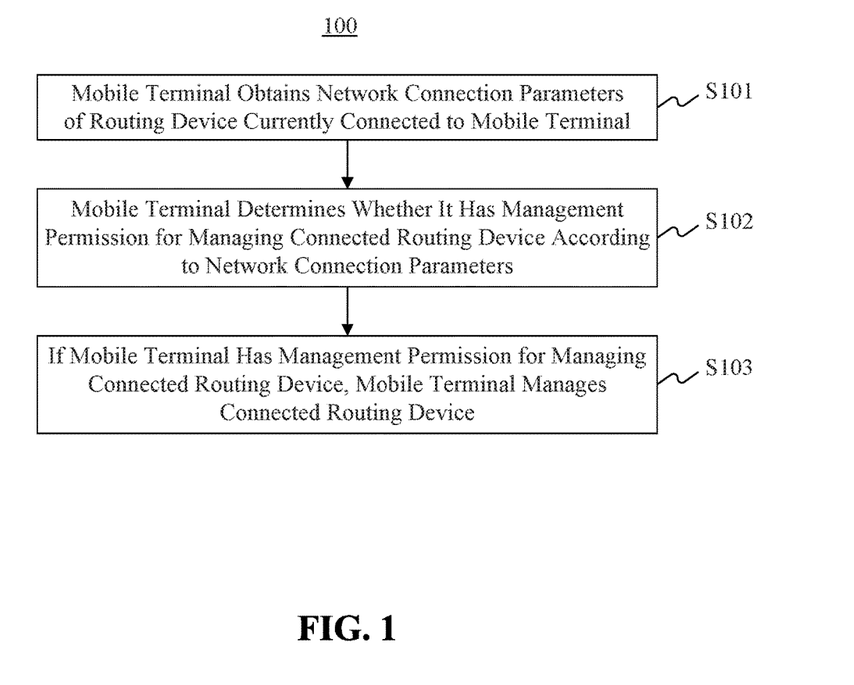
FIG. 1 is a flow chart of a method for managing a routing device according to an exemplary embodiment.

FIG. 1 is a flow chart of a method 100 for managing a routing device according to an exemplary embodiment. The method 100 for managing the routing device can be performed by a mobile terminal. As shown in FIG. 1, the method 100 can include the following steps.

In step S101, a mobile terminal obtains one or more network connection parameters of a routing device currently connected to the mobile terminal.

In step S102, the mobile terminal determines whether it has a management permission for managing the connected routing device according to the network connection parameters.

In step S103, if the mobile terminal has the management permission for managing the connected routing device, it manages the connected routing device.

In the method 100 of the present disclosure, the user does not need to manually switch, and the routing device managed by the mobile terminal can be automatically switched according to the network connection parameters of the currently-connected routing device. Thus, the complexity of managing routing devices can be reduced. The method 100 provides a more convenient way for managing the routing devices.

In another embodiment of the present disclosure, before the mobile terminal determines whether it has the management permission for managing the connected routing device according to the network connection parameters, the method 100 further includes: presetting and storing, by the mobile terminal, a router management list which includes network connection parameters of each routing device that can be managed by the mobile terminal.

In another embodiment of the present disclosure, the determining, by the mobile terminal, whether it has the management permission for managing the connected routing device according to the network connection parameters includes: comparing, by the mobile terminal, the network connection parameters obtained in step S101 with the network connection parameters of each routing device in the router management list; and if the obtained network connection parameters match with the network connection parameters of any routing device in the router management list, determining, by the mobile terminal, that it has the management permission for managing the connected routing device.

In another embodiment of the present disclosure, after determining, by the mobile terminal, whether it has the management permission for managing the connected routing device according to the network connection parameters, the method 100 further includes: if the mobile terminal does not have the management permission for managing the connected routing device, obtaining, by the mobile terminal, a first wireless signal list which includes device names of routing devices in a current environment; comparing, by the mobile terminal, the device names of the first wireless signal list with a device name of each routing device in a second wireless signal list, which is obtained by the connected routing device from the current environment; and if a device name of a target routing device in the first wireless signal list matches a device name of a routing device in the second wireless signal list, and network connection parameters of the target routing device match the network connection parameters of any routing device in the router management list, managing, by the mobile terminal, the target routing device.

In another embodiment of the present disclosure, the network connection parameters include at least a service set identifier (SSID) and a connection password.

The embodiments explained above can be combined with each other as along as the combination is consistent with the scope of this disclosure.

Figure 2A:
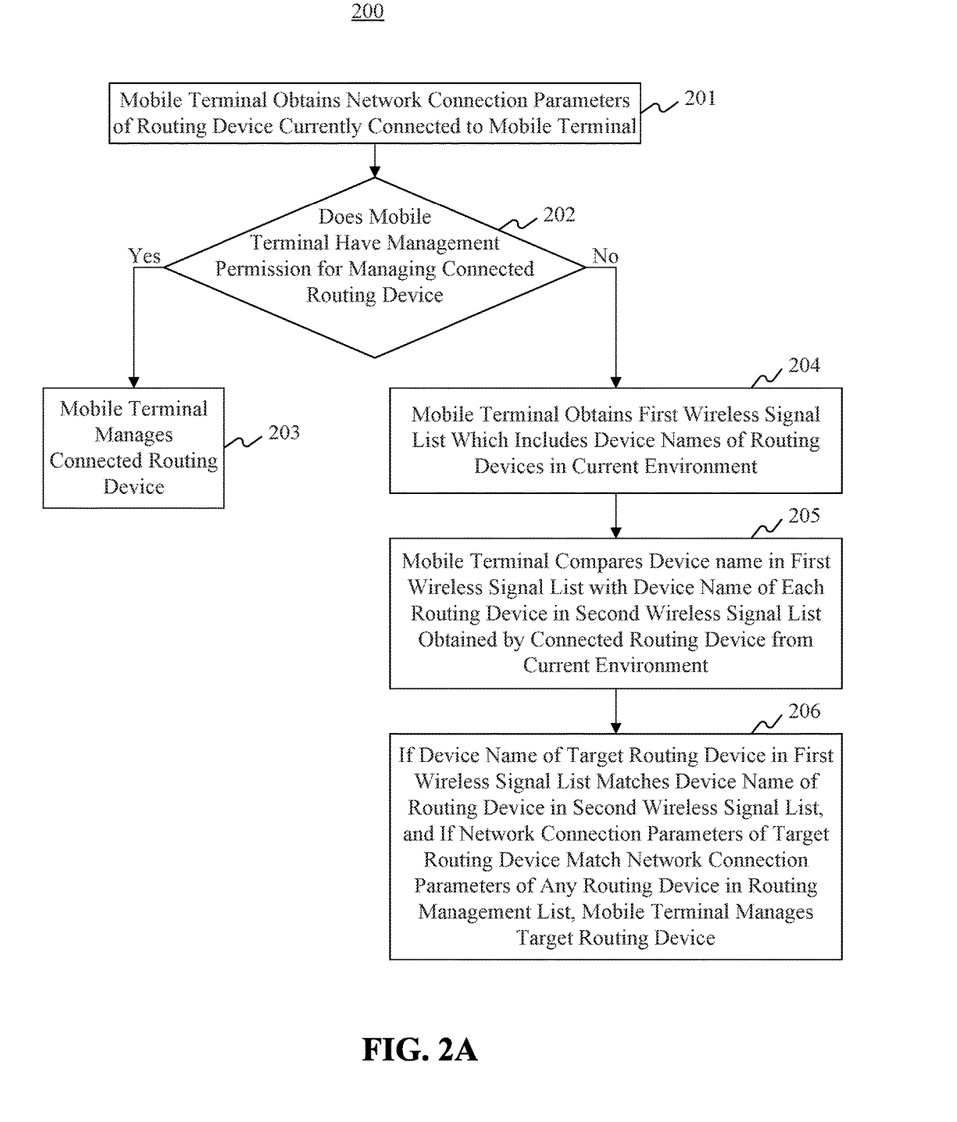
FIG. 2A is a flow chart of another method for managing a routing device according to an exemplary embodiment.

FIG. 2A is a flow chart illustrating a method 200 for managing a routing device according to an exemplary embodiment. The method 200 for managing a routing device can be performed by a mobile terminal, and, as shown in FIG. 2A, can include the following steps.

In step S201, a mobile terminal obtains network connection parameters of a routing device currently connected to the mobile terminal.

The mobile terminal may be a smart phone, a tablet, a notebook computer, and the like, and the embodiment of the present disclosure does not impose specific limitations on types of the mobile terminal. The mobile terminal has a network connection function, can receive Wireless Fidelity (WiFi) signals broadcasted by the routing device, and establish a connection with the routing device by, for example, inputting corresponding connection password. Various applications, such as reader applications, audio applications, video applications, navigation applications, shopping applications, management applications, and the like, can be installed in the mobile terminal. In some embodiments, the management applications include a router management application for managing routing devices.

The network connection parameters include, for example, an SSID and a connection password, and the like, and the embodiment of the present disclosure does not impose specific limitations on the network connection parameters. When the mobile terminal is moved from one place to another, the mobile terminal enables a WiFi function to receive WiFi signals broadcasted by a routing device in a place the mobile terminal currently is located. The mobile terminal may establish a connection with the routing device by, for example, inputting the connection password. In the process of establishing the connection with the routing device, the mobile terminal can scan an SSID of the currently-connected routing device and obtain other network connection parameters, such as the connection password.

In step S202, the mobile terminal determines whether it has a management permission for managing the connected routing device according to the network connection parameters. If the mobile terminal has the management permission for managing the connected routing device, step S203 is performed. If the mobile terminal does not have the management permission for managing the connected routing device, step S204 is performed.

In some embodiments, a large piece of user data, such as office documents, movies, photos, and the like, may be stored in the routing device. Such data is not open to all users. Any mobile terminal may be installed with the management application. To protect the data stored in the routing device, the method 200 allows mobile devices having proper permission to manage the data. The method 200 includes setting a router management list before managing the routing device. Network connection parameters of each routing device that can be managed by the mobile terminal are identified in the router management list, and can be used to determine whether the mobile terminal has a management permission for managing the routing device.

In setting the router management list, the mobile terminal can provide a setting interface of the routing device. The user sets network connection parameters of the routing device that can be managed by the mobile terminal on the setting interface of the routing device according to usage requirements. The mobile terminal detects user's operation, and sets the router management list according to the user's operation. To facilitate subsequent application, after setting the router management list, the mobile terminal also stores the router management list in a storage medium, such as a flash memory, a memory, and the like.

As an example, the following Table 1 shows the a router management list.

TABLE 1

| Routing device | Network connection parameters | |
|---|---|---|
| | SSID | Connection password |
| A | LuyoushebeiA | 1234 |
| B | LuyoushebeiB | 5678 |
| C | LuyoushebeiC | 3692 |

Figure 2B:
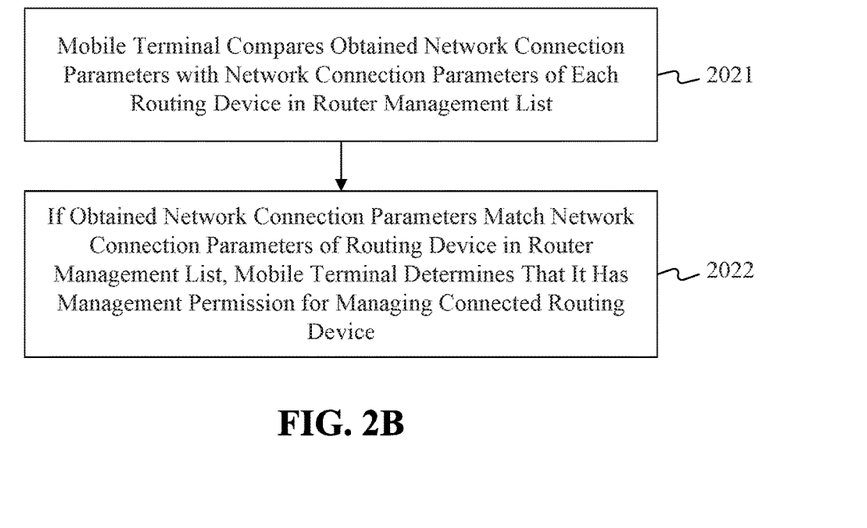
FIG. 2B is a flow chart of a method for determining whether a mobile terminal has a management permission for managing a connected routing device according to an exemplary embodiment.

Based on the pre-stored router management list, the mobile terminal can, according to the network connection parameters, perform the following steps S2021 and S2022 to determine whether it has the management permission for managing the connected routing device.

Referring to FIG. 2B, in step S2021, the mobile terminal compares the obtained network connection parameters with the network connection parameters of each routing device in the router management list.

In some embodiments, the network connection parameters of the connected routing device obtained by the mobile terminal have various types. The mobile terminal can compare an obtained network connection parameter with a network connection parameter on the list of the same type. When the obtained network connection parameters are compared with the network connection parameters of each manageable routing device in the router management list, the obtained network connection parameters should be compared with the network connection parameters having the same type in the router management list. For example, the SSID of the connected routing device is compared with an SSID of each routing device in the router management list. The connection password of the connected routing device is compared with a connection password of each routing device in the router management list.

In step S2022, if the obtained network connection parameters match the network connection parameters of a routing device in the router management list, the mobile terminal determines that it has the management permission for managing the connected routing device.

When the network connection parameters of the connected routing device match the network connection parameters of a routing device in the router management list, it means that the connected routing device is one of the routing devices in the router management list. The mobile terminal can determine that it has the management permission for managing the connected routing device, and can manage the connected routing device in step S203.

Referring to FIG. 2A, in step S203, the mobile terminal manages the connected routing device. After the mobile terminal determines that it has the management permission for managing the connected routing device, the mobile terminal can access data stored in the connected routing device, control web browsing, control the number of offline users, control bandwidth, and the like.

For example, an SSID of a connected routing device is LuyoushebeiA, and a connection password of the connected routing device is 1234. The mobile terminal compares the network connection parameters of the connected routing device with the network connection parameters in the router management list. Since the network connection parameters of the connected routing device match the network connection parameters of the routing device A in the router management list shown in Table 1, the mobile terminal can determine that it has the management permission for managing the connected routing device, which is the routing device A. In some embodiments, each of the obtained network connection parameters of the connected routing device is matched with each of the network connection parameters of a routing device in the router management list.

In some embodiments, the network connection parameters of the routing device are not unchangeable. The user may modify the set of network connection parameters during usage. When this happens, the mobile terminal may find no match when comparing the obtained network connection parameters of the connected routing device with the network connection parameters in the router management list. The mobile terminal may misjudge that it does not have the management permission for managing the connected routing device. In order to avoid this situation, when the mobile terminal determines whether it has the management permission for managing the connected routing device, it may calculate a matching degree from the comparison. if a matching degree between the network connection parameters of the connected routing device and the network connection parameters of a routing device in the router management list is higher than a predetermined threshold, it can be determined that the mobile terminal has the management permission for managing the connected routing device. For example, the predetermined threshold may be 60%, 70%, 80%, and the like, and the embodiment of the present disclosure does not impose specific limitations on the predetermined threshold.

After the mobile terminal determines that it does not have the management permission for managing the connected routing device, the mobile terminal may proceed to find another routing device which the mobile terminal has the permission to manage through the following steps S204 to S206.

In step S204, the mobile terminal obtains a first wireless signal list which includes device names of routing devices in a current environment.

When the mobile terminal determines that it does not have the management permission for managing the connected routing device, the mobile terminal scans WiFi signals in its current environment, obtains the first wireless signal list which includes the device names of the routing devices in the current environment. The device names may be SSIDs of the routing devices.

In step S205, the mobile terminal compares the device names on the first wireless signal list with a device name of each routing device in a second wireless signal list which is obtained by the connected routing device from the current environment.

In the field of Internet technologies, the connected routing device may scan WiFi signals broadcasted by other routing devices in the current environment, and generate the second wireless signal list. The device names of other routing devices in the current environment where the connected routing device resides are shown in the second wireless signal list. The mobile terminal also stores the second wireless signal list.

In the present embodiment, by comparing the device names on the first wireless signal list with a device name of each routing device in the second wireless signal list through the mobile terminal, network environment where the mobile terminal currently resides can be found.

In step S206, if a device name of a target routing device in the first wireless signal list matches a device name of a routing device in the second wireless signal list, and if network connection parameters of the target routing device match the network connection parameters of a routing device in the router management list, the mobile terminal determines that it can manage the target routing device.

When a device name of a routing device in the first wireless signal list matches a device name of a routing device in the second wireless signal list, the device is determined to be the target routing device. Moreover, it can be determined that the mobile terminal is in the network environment of the target routing device. In order to further determine whether the target routing device is a routing device that can be managed by the mobile terminal, the mobile terminal also compares the network connection parameters of the target routing device with the network connection parameters of a routing device in the router management list. If the network connection parameters of the target routing device match the network connection parameters of a routing device in the router management list, or if a matching degree between the network connection parameters of the target routing device and the network connection parameters of a routing device in the router management list is greater than a predetermined threshold, it can be determined that the mobile terminal has the management permission for managing the target routing device. The mobile terminal can begin managing the target routing device.

Figure 3:
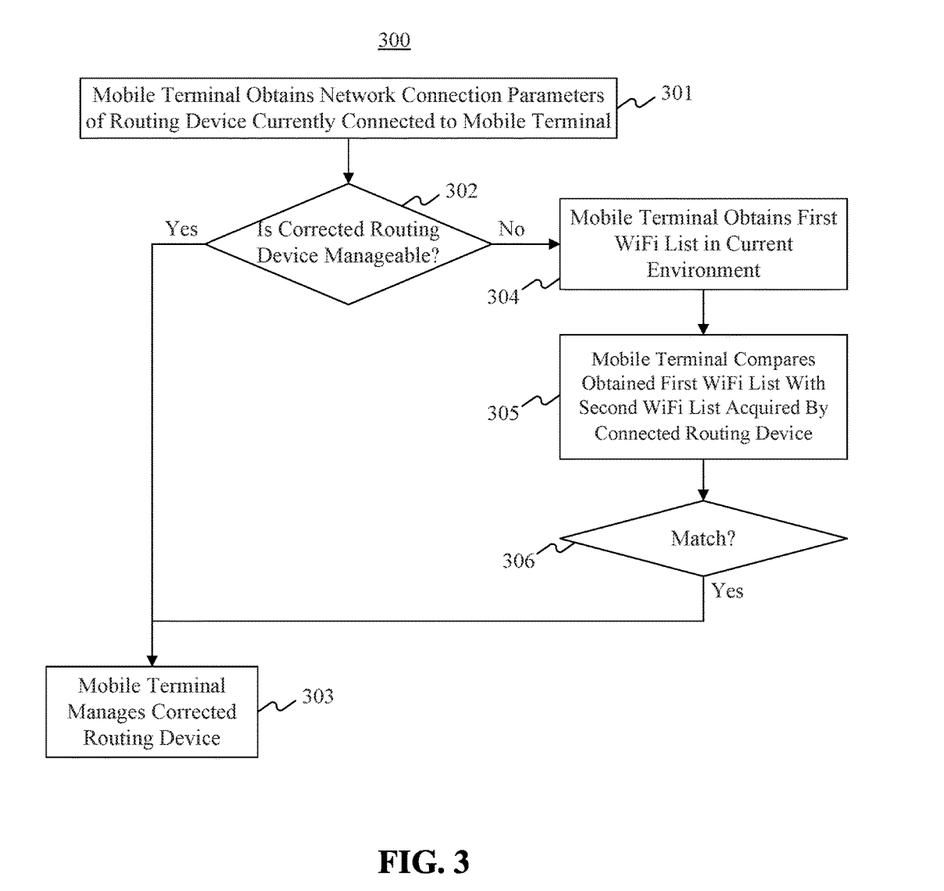
FIG. 3 is a flow chart of a method for managing a routing device according to an exemplary embodiment.

FIG. 3 is a flow chart illustrating an exemplary method 300 for a mobile terminal managing a routing device. The method 300 may be performed by a mobile terminal and include the following steps.

In step S301, when the mobile terminal is moved from one place to another, in establishing of a connection with the routing device in the current environment, the mobile terminal can obtain one or more network connection parameters of a routing device currently connected to the mobile device. The network connection parameters may include an SSID, connection password, and the like.

In step S302, according to the obtained network connection parameters, the mobile terminal determines whether it can manage the connected routing device. If it is determined that the connected routing device is a manageable routing device and the mobile terminal has the management permission for managing the connected routing device, in step S303, the mobile terminal can manage the routing device. If it is determined that the connected routing device is not the manageable routing device for the mobile terminal or the mobile terminal does not have the management permission for managing the connected routing device, in step S304, the mobile terminal obtains a first WiFi list in the current environment, and matches the obtained first WiFi list with a second WiFi list acquired by the connected routing device. The connected routing device acquires the second WiFi list by scanning. In step S306, the mobile terminal determines whether there is a match between the names on the first WiFi list and the second WiFi list. When a target routing device in the first WiFi list has a same device name as one in the second WiFi list of the connected routing device, in step S303, the mobile terminal manages the target routing device.

In the methods provided by embodiments of the present disclosure, the user does not need to manually switch to a connected routing device when the user's mobile device is moved from one environment to another. The routing device that the mobile terminal manages can be automatically switched according to the network connection parameters of the currently-connected routing device. Thus, the complexity of managing routing devices can be reduced. The methods explained above provide a more convenient way for managing routing devices.

Figure 4:
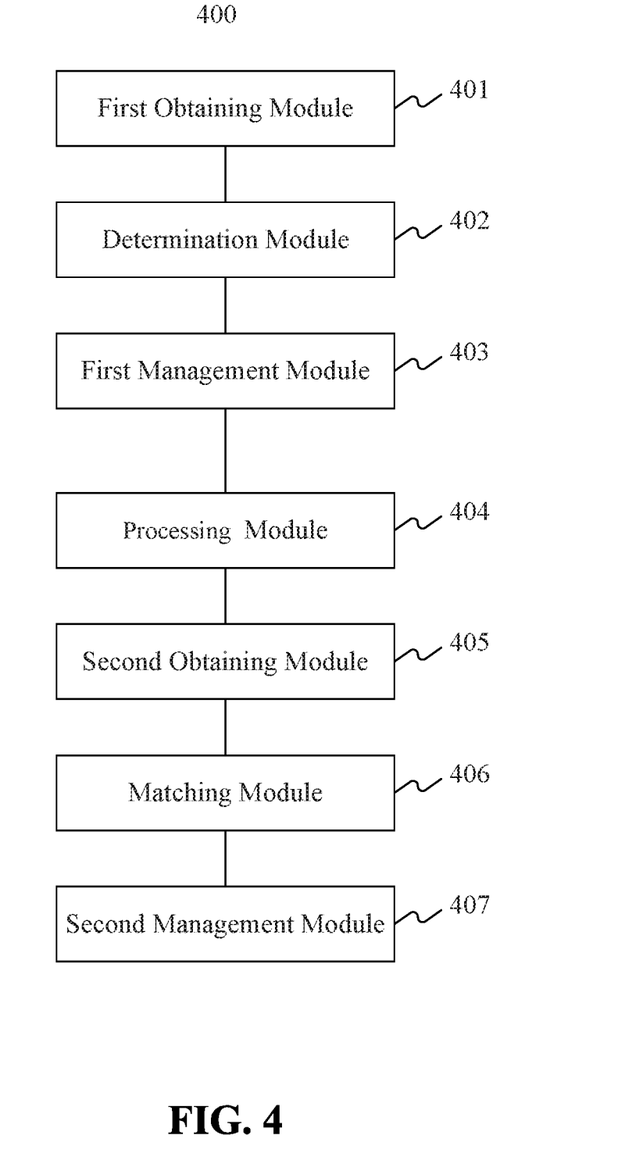
FIG. 4 is a block diagram of a mobile terminal for managing a routing device according to an exemplary embodiment.

FIG. 4 is a block diagram of a mobile terminal 400 according to an exemplary embodiment. Referring to FIG. 4, the mobile terminal 400 includes: a first obtaining module 401, a determination module 402, and a first management module 403.

The first obtaining module 401 is configured to obtain network connection parameters of a routing device currently connected to the mobile terminal 400.

The determination module 402 is configured to, according to the network connection parameters, determine whether the mobile terminal 400 has a management permission for managing the connected routing device.

The first management module 403 is configured to, if the mobile terminal 400 has the management permission for managing the connected routing device, manage the connected routing device.

In another embodiment of the present disclosure, the mobile terminal 400 further includes a processing module 404 configured to preset and store a router management list which includes network connection parameters of each routing device that can be managed by the mobile terminal 400.

In another embodiment of the present disclosure, the determination module 402 is configured to compare the obtained network connection parameters with the network connection parameters of each routing device in the router management list. If the obtained network connection parameters match the network connection parameters of a routing device in the router management list, the determination module 402 is configured to determine that the mobile terminal 400 has the management permission for managing the connected routing device.

In another embodiment of the present disclosure, the mobile terminal 400 further includes a second obtaining module 405, a matching module 406, and a second management module 407.

The second obtaining module 405 is configured to, if the mobile terminal 400 does not have the management permission for managing the connected routing device, obtain a first wireless signal list which includes device names of routing devices in a current environment of the mobile terminal 400.

The matching module 406 is configured to compare the names of the first wireless signal list with a device name of each routing device in a second wireless signal list which is obtained by the connected routing device from the current environment.

The second management module 407 is configured to, if a device name of a target routing device in the first wireless signal list matches with a device name of a routing device in the second wireless signal list, and if network connection parameters of the target routing device match with network connection parameters of a routing device in the router management list, manage the target routing device.

In another embodiment of the present disclosure, the network connection parameters include at least an SSID and a connection password.

With respect to the mobile terminal 400 in the above embodiments, the specific manners for performing operations of the modules have been described in detail in the embodiments regarding the methods 100, 200, and 300, which will not be elaborated herein.

Figure 5:
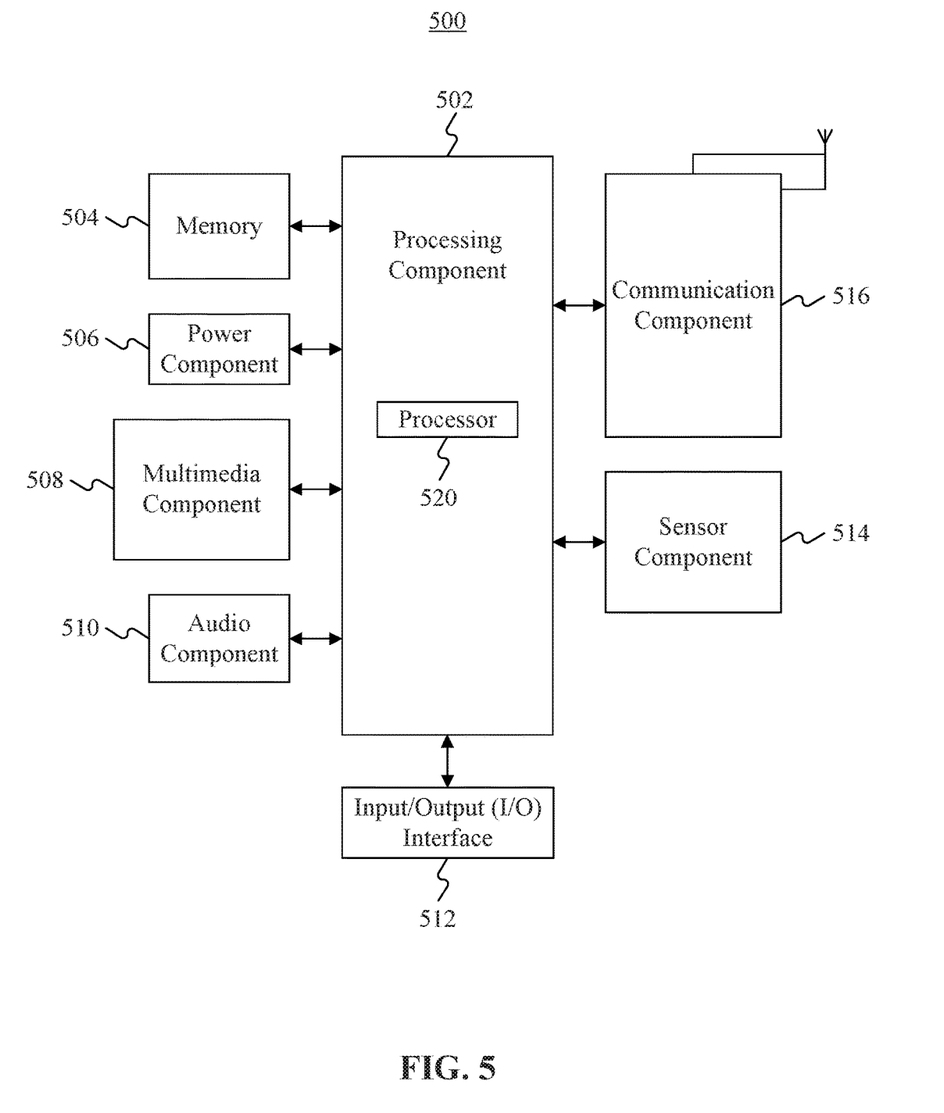
FIG. 5 is a block diagram of an apparatus for managing a routing device according to an exemplary embodiment.

FIG. 5 is a block diagram of an apparatus 500 for managing a routing device according to an exemplary embodiment. For example, the apparatus 500 may be a mobile terminal described above, such as a mobile phone, a computer, a digital broadcast terminal, a messaging device, a gaming console, a tablet, a medical device, exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, 3G, or 4G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the apparatus 500, for performing the above-described methods. For example, the non-transitory computer-readable storage medium may be a ROM, a RAM, a CD-ROM, a magnetic tape, a floppy disc, an optical data storage device, and the like.

The present disclosure further provides a non-transitory computer-readable storage medium having stored therein instructions that, when executed by a processor of a mobile terminal, cause the mobile terminal to perform the above methods 100, 200, and 300 for managing a routing device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for managing a routing device, comprising:
   obtaining, by a mobile terminal, first network connection parameters of a routing device connected to the mobile terminal;
   presetting and storing, by the mobile terminal, a router management list including second network connection parameters of each routing device that can be managed by the mobile terminal;
   according to the first network connection parameters, determining, by the mobile terminal, whether the mobile terminal has a management permission for managing the connected routing device;
   if the mobile terminal has the management permission for managing the connected routing device, managing, by the mobile terminal, the connected routing device; and
   if the mobile terminal does not have the management permission for managing the connected routing device:
      obtaining, by the mobile terminal, a first wireless signal list which includes device names of routing devices in a current environment;
      receiving and recording, at the mobile terminal, a second wireless signal list which has been obtained by the connected routing device from the current environment;
      comparing, by the mobile terminal, a device name in the first wireless signal list with a device name of each routing device in the second wireless signal list; and
      if a device name of a target routing device in the first wireless signal list matches a device name of a routing device in the second wireless signal list, and if network connection parameters of the target routing device match the second network connection parameters of any routing device in the router management list, managing, by the mobile terminal, the target routing device.

2. The method according to claim 1, wherein the determining whether the mobile terminal has the management permission for managing the connected routing device according to the first network connection parameters comprises:
   comparing, by the mobile terminal, the first network connection parameters with the second network connection parameters of each routing device in the router management list; and
   if the first network connection parameters match the second network connection parameters of a routing device in the router management list, determining, by the mobile terminal, that the mobile terminal has the management permission for managing the connected routing device.

3. The method according to claim 1, wherein the network connection parameters comprise at least a service set identifier and a connection password.

4. A mobile terminal for managing a routing device, comprising:
   a processor; and
   a memory for storing instructions executable by the processor;
   wherein the processor is configured to:
   obtain first network connection parameters of a routing device connected to the mobile terminal;
   preset and store a router management list including second network connection parameters of each routing device that can be managed by the mobile terminal;
   according to the first network connection parameters, determine whether the mobile terminal has a management permission for managing the connected routing device;
   if the mobile terminal has the management permission for managing the connected routing device, manage the connected routing device; and
   if the mobile terminal does not have the management permission for managing the connected routing device:
      obtain a first wireless signal list which includes device names of routing devices in a current environment;
      receive and record a second wireless signal list which has been obtained by the connected routing device from the current environment;
      compare a device name in the first wireless signal list with a device name of each routing device in the second wireless signal list; and
      if a device name of a target routing device in the first wireless signal list matches a device name of a routing device in the second wireless signal list, and if network connection parameters of the target routing device match the second network connection parameters of any routing device in the router management list, manage the target routing device.

5. The mobile terminal according to claim 4, wherein the processor is further configured to:
   compare the first network connection parameters with the second network connection parameters of each routing device in the router management list; and
   if the first network connection parameters match the second network connection parameters of a routing device in the router management list, determine that the mobile terminal has the management permission for managing the connected routing device.

6. The mobile terminal according to claim 4, wherein the network connection parameters comprise at least a service set identifier SSID and a connection password.

7. A non-transitory readable storage medium storing instructions that, when executed by a processor of a mobile terminal, cause the processor to perform a method for managing a routing device, the method comprising:
   obtaining, by a mobile terminal, first network connection parameters of a routing device connected to the mobile terminal;
   presetting and storing, by the mobile terminal, a router management list including second network connection parameters of each routing device that can be managed by the mobile terminal;
   according to the first network connection parameters, determining, by the mobile terminal, whether the mobile terminal has a management permission for managing the connected routing device;
   if the mobile terminal has the management permission for managing the connected routing device, managing, by the mobile terminal, the connected routing device; and if the mobile terminal does not have the management permission for managing the connected routing device:
  obtaining, by the mobile terminal, a first wireless signal list which includes device names of routing devices in a current environment;
  receiving and recording, at the mobile terminal, a second wireless signal list which has been obtained by the connected routing device from the current environment;
  comparing, by the mobile terminal, a device name in the first wireless signal list with a device name of each routing device in the second wireless signal list; and
  if a device name of a target routing device in the first wireless signal list matches a device name of a routing device in the second wireless signal list, and if network connection parameters of the target routing device match the second network connection parameters of any routing device in the router management list, managing, by the mobile terminal, the target routing device.

\* \* \* \* \*